United States Patent

[11] 3,533,430

| | | |
|---|---|---|
| [72] | Inventor | John V. Fredd<br>Dallas, Tex. |
| [21] | Appl. No. | 812,490 |
| [73] | Assignee | Otis Engineering Corporation<br>Dallas, Tex.,<br>a corporation of Delaware<br>Division of Ser. No. 445,116, filed<br>Apr. 2, 1965, now Patent No. 3,454,029,<br>July 8, 1969. Divided and this application,<br>Ser. No. 812,490 |

[54] SHUTTLE VALVE
12 Claims, 11 Drawing Figs.

[52] U.S. Cl............................................. 137/112;
   166/224
[51] Int. Cl................................................ E21b 33/00
[50] Field of Search......................................... 166/151,
   189; 137/111, 112, 113

[56] References Cited
UNITED STATES PATENTS

| 2,634,743 | 4/1953 | Audemar.................. | 137/112 |
| 2,651,491 | 9/1953 | Ashton et al.............. | 137/113X |
| 3,126,908 | 3/1964 | Dickens..................... | 137/460 |
| 3,200,837 | 8/1965 | Brown...................... | 166/224X |
| 3,236,255 | 2/1966 | Sizer........................ | 166/224X |
| 3,273,588 | 9/1966 | Dollison.................... | 166/224X |

Primary Examiner—William F. O'Dea
Assistant Examiner—David J. Zobkiw
Attorney—E. Hastings Ackley ABSTRACT: A valve system for connecting either of two pressure zones or areas with a third pressure zone or area responsive to the respective pressures in the two pressure zones or areas.

Patented Oct. 13, 1970

INVENTOR
John V. Fredd

BY
ATTORNEYS

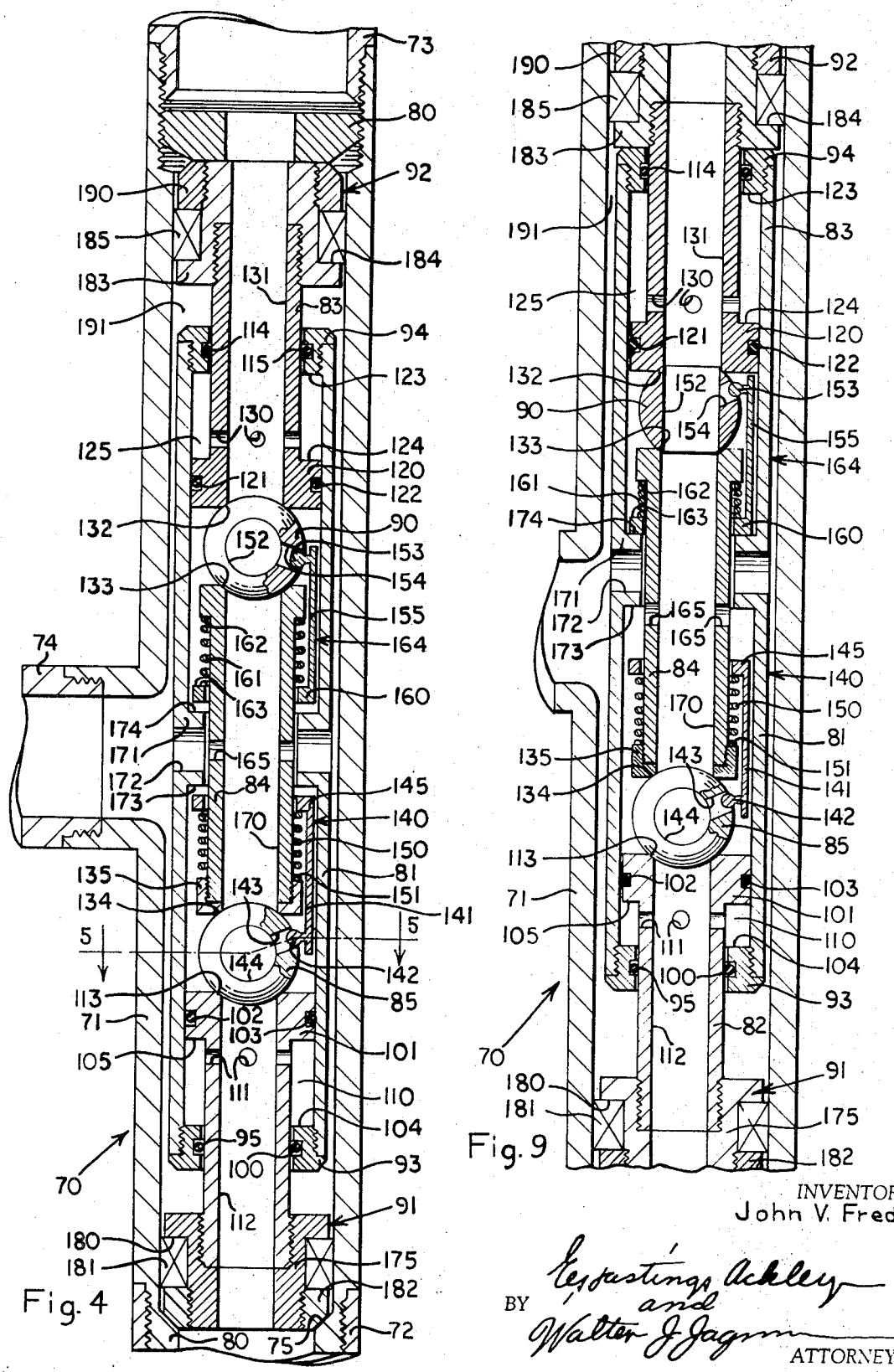

INVENTOR
JOHN V. FREDD
ATTORNEYS

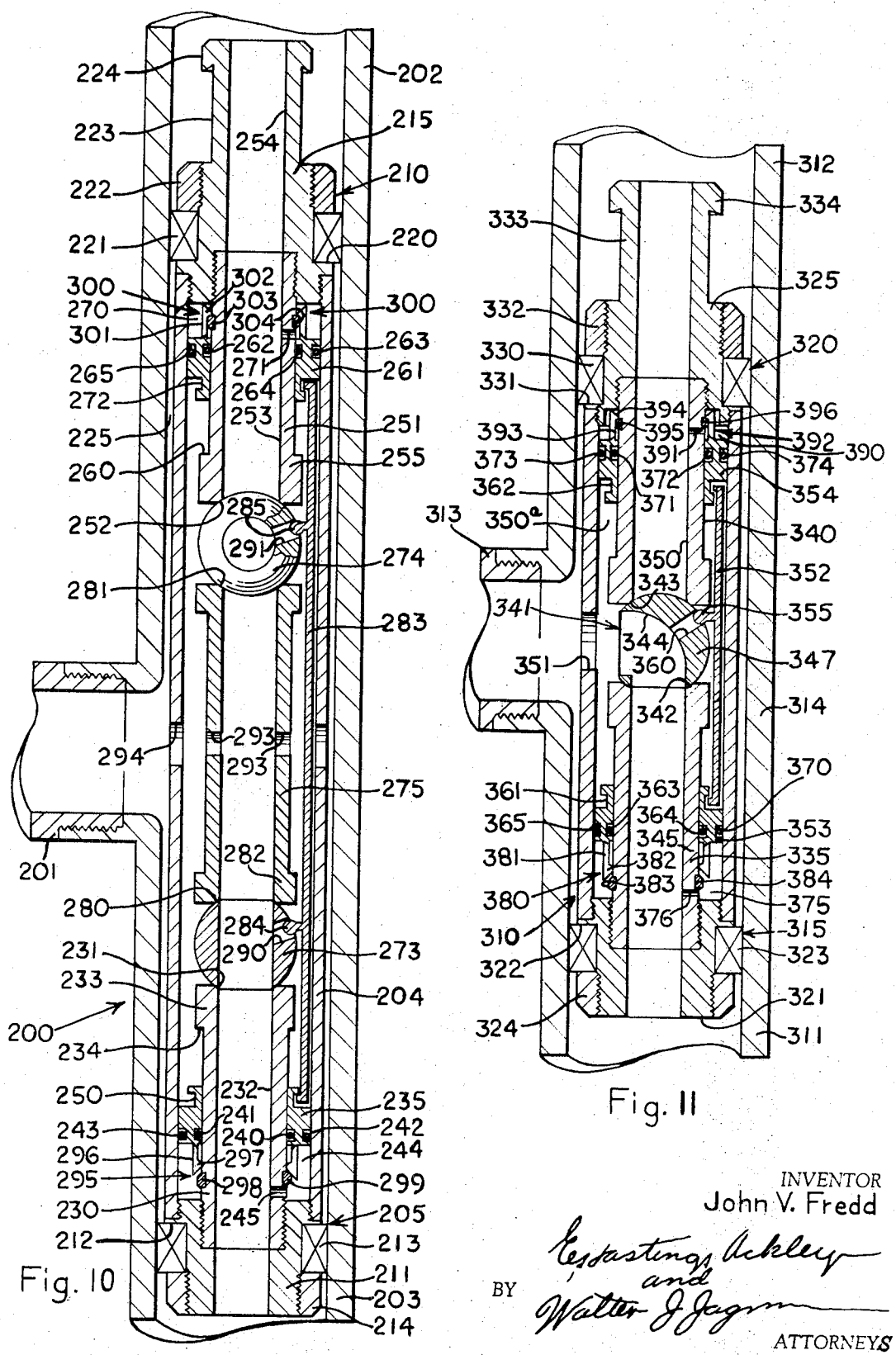

3,533,430

SHUTTLE VALVE

This is a division of application Ser. No. 445,116, filed Apr. 2, 1965 and which issued as U.S. Pat. No. 3,454,029 on July 8, 1969.

This invention relates to valves and more particularly relates to pressure operated valves.

It is a principal object of this invention to provide a new and improved valve.

It is another object of the invention to provide a valve which is selectively operated by fluid pressure to position the valve for control of fluid flow between selected groups of zones.

It is a further object of the invention to provide a valve connectable to at least three pressure sources with the first source being selectively connectable with the second and third sources while the second and third sources are not connectable with each other.

It is another object of the invention to provide a valve connectable to three pressure sources and operable by the pressure of either the second or third sources but not by the pressure of the first source.

It is an additional object of the invention to provide a valve connectable to three pressure sources and operable by the pressure in either the second or third sources and when opened may be maintained in such position by pressure from either the source which effected the opening or by the pressure of the first source irrespective of whether or not flow is occurring through the valve.

It is a particularly important object of the invention to provide a valve connectable to at least three pressure sources and operable by only the pressure in either of two of the sources to move the valve to a position to communicate with the source which effected opening the valve and the third source but which after opening permits holding the valve open by the pressure of either source and allows flow in either direction between the communicating sources.

It is a still further object of the invention to provide an apparatus for controlling fluid flow between one zone and either of two other zones wherein a valve means is operable between one position for controlling flow between the first and second zones while closing off a third zone and another position for controlling the flow between the first and third zones while closing the second zone, the valve being operable in response to a pressure differential between the second and third zones.

It is another object of the invention to provide fluid flow control apparatus for interconnecting a first zone with either of two other zones which includes plug-type valves which are reciprocable between four positions for controlling flow between selected groups of the zones and closing off all flow between the zones.

It is a further object of the invention to provide apparatus for controlling fluid flow between a first zone and either of two additional zones which includes a ball-type valve element in the flow path loading to each of the additional zones.

It is also an object of the invention to provide apparatus for controlling fluid flow between a first zone and either of second and third zones including a ball valve which is rotatable between two positions for interconnecting either the first and second zones or the first and third zones.

Additional objects and advantages of the invention will be readily apparent from the reading of the following description of a device constructed in accordance with the invention, and reference to the accompanying drawings thereof, wherein:

FIG. 4, is a longitudinal sectional view of another form of the valve constructed in accordance with the invention;

FIG. 9 is a fragmentary longitudinal sectional view of the valve of FIG. 4 showing one of the ball valves in open position to permit communication between two of the flow conduits;

FIG. 10 is a longitudinal sectional view of an additional form of valve in accordance with the invention, illustrating one of the ball valves in open position and the other ball valve in closed position; and FIG. 11 is a longitudinal view in section illustrating a still further form of valve in accordance with the invention showing the ball valve in one open position.

Figure 1:
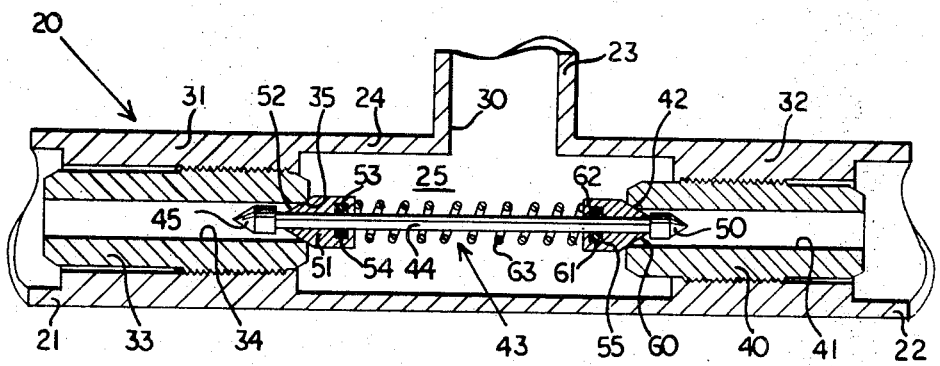
FIG. 1, is a longitudinal sectional view of a valve constructed according to the invention, showing the valve in closed position with no fluid communication between the zones interconnected by the valve.

Referring to FIG. 1 the valve 20 is shown connected to a first flow conduit 21 leading to a first pressure source or zone, a second flow conduit 22 leading to a second pressure source or zone, and a third flow conduit 23 leading to a third pressure source or zone. The valve includes a housing 24 having a central flow passage 25 extending therethrough communicating with a lateral opening 30 to permit fluid communication with the conduit 23. On opposite sides of the lateral opening the valve housing is reduced in internal diameter and internally threaded along the section 31 and the section 32. The valve seat body 33 is threaded into the section 31 of the valve housing and provided with a bore 34 surrounded by an annular seat surface 35 formed around the bore at the inward end of the body. The valve seat body 40 is threaded into the section 32 of the valve body and provided with an internal bore 41 surrounded by an annular valve seat 42 at the inward end of the body.

A dual reciprocable valve assembly 43 is positioned within the bore of the valve body between the valve seat bodies to cooperate with the valve seat surfaces 35 and 42 for controlling fluid flow through the valve. The valve assembly includes a valve rod 44 with head members 45 and 50 secured on opposite ends. A valve element 51 is slidably disposed on the valve rod and provided with a conical surface 52 to cooperate with the valve seat 35 for controlling flow between the bore of the valve housing and the bore 34 through the valve seat body 33. An O-ring 53 is positioned within the internal annular recess 54 of the valve element 51 to seal between the rod and the valve element against leakage along the rod through the valve element. Another valve element 55 is slidably disposed on the valve rod to control the fluid flow between the bore of the valve housing and the bore 41 through the valve seat body 40. The valve element 55 has a conical seat surface 60 which cooperates with the valve seat 42 to close off fluid flow between the bore of the housing and the bore of the valve seat body. An O-ring 61 within the internal annular recess 62 of the valve element 55 seals between the valve element and the valve rod. A spring 63 around the valve rod biases the valve elements 51 and 55 away from each other toward the ends of the rod and the valve seats.

The valve is shown in FIG. 1 in the fully closed position in which there is no flow through the valve between any of the interconnected zones. The valve assembly is movable by the pressure in the conduits 21 and 22 from the position shown in FIG. 1 to either of the positions illustrated in the FIGS. 2 and 3. The valve cannot be moved from the fully closed position shown in FIG. 1 by the pressure within the conduit 23. During operation, the valve will remain closed as in FIG. 1 with each of the valve elements positioned on its respective seat so long as the pressure within the conduit 23 and the bore 25 of the valve housing remains greater than the pressure in both of the conduits 21 and 22. In this position of the valve there can be no fluid communication between the conduits 21 and 22 or between either of these conduits and the conduit 23.

Figure 2:
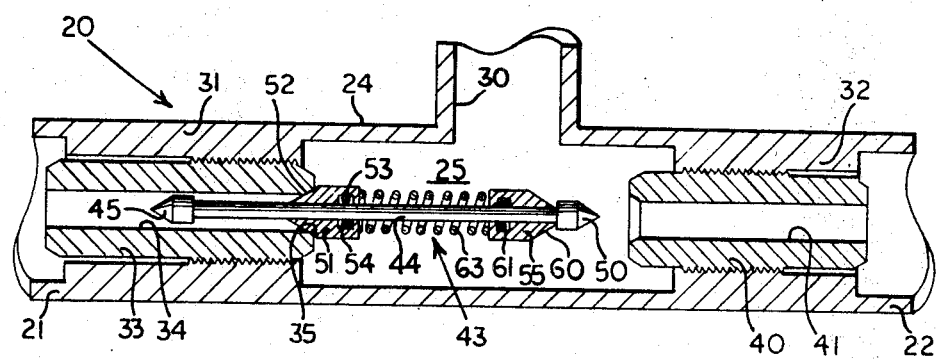
FIG. 2, is a longitudinal sectional view of the valve of FIG. 1 showing the valve in one open position with communication between first and third pressure sources or zones.

When fluid communication is desired between the conduits 22 and 23, the pressure within the conduit 22 is raised to a value in excess of the pressure within the conduits 21 and 23 to displace the valve element 55 from the seat 42 to open the bore 41 into communication with the bore 25 as illustrated in FIG. 2. In order for the valve element to be moved from its seat the spring 63 is compressed and the valve rod slides through the other valve element 51 with the end member 45 and a portion of the valve rod moving the farther into the bore 34. With the valve opened to the position shown in FIG. 2 the pressure differential between the bore 25 and the bore 34 acts on the cross section of the valve rod through the O-ring 53 in the valve element 51 and so long as such pressure differential exists, the valve assembly will remain in the open position to permit fluid flow in either direction between the conduits 22 and 30. Even if flow between the conduits 22 and 23 ceases, the valve will remain open so long as there is a pressure differential between bores 25 and 34 to hold the valve in the position illustrated in FIG. 2. When the pressure within the bore 25 decreases to a value at which the pressure differential between the bore 25 and the bore 34 acting on the valve rod is below the combined force on the rod of the pressure within the bore 34 and the compressed spring 63, the valve assembly will be returned to the position shown in FIG. 1 with the valve element 55 seating on the surface 42 to close the bore 41.

Figure 3:
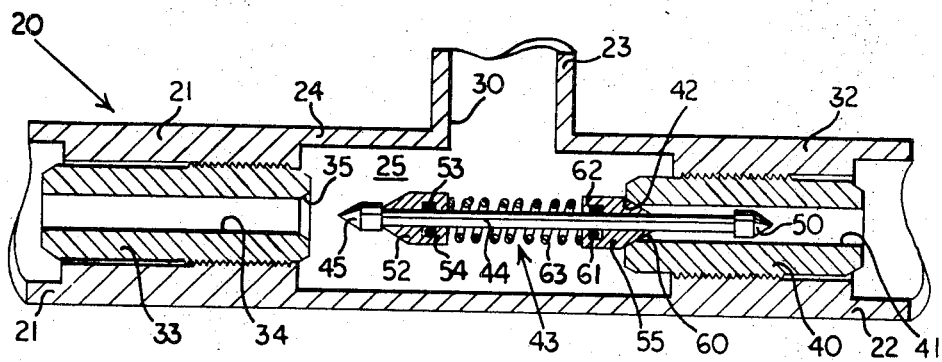
FIG. 3, is a longitudinal sectional view of the valve of FIG. 1 illustrating the valve in a second open position providing communication between the second and third pressure sources.

If fluid communication is desired between the conduits 21 and 23, the pressure within the conduit 21 is raised to a value which will cause such pressure acting through the bore 34 to displace the valve element 51 from the seat 35 compressing the spring 63 and sliding the end member 50 and the valve rod farther into the bore 41 as illustrated in FIG. 3. After the valve element 51 has been moved away from the seat 35 as shown in FIG. 3 the valve assembly will remain substantially in the position illustrated so long as the pressure within the bore 25 is of a sufficient value that the force of the pressure acting across the section of the valve rod within the O-ring 61 exceeds the force resulting from the pressure within the bore 41 together with the force exerted by the spring 63. With the valve assembly in such open position fluid may flow in either direction between the conduits 21 and 23 and the valve assembly will continue to remain open even when fluid flow ceases so long as the pressure within the chamber 25 is of sufficient value to hold the valve assembly in the position shown.

Fluid communication may be established from both the conduits 21 and 22 simultaneously into the conduit 23. The pressures in both the conduits 21 and 22 are raised to levels substantially equal to each other and above the pressure in the chamber 25. Both the valve elements 51 and 55 are displaced inwardly along the valve rod from their respective seats to permit simultaneous flow from both the conduits 21 and 22 through the chamber 25 into the conduit 23. It will be obvious, of course, that if a pressure differential develops between the conduits 21 and 22, the valve element controlling the flow from the conduit having the lower pressure will close. For example, if the pressure in the conduit 22 exceeds the pressure in the conduit 21 with both valve elements open, the higher pressure in the conduit 22 will be transmitted into the chamber 25 to cause a pressure differential across the valve element 21 to force it back to its seat and close the bore 34. Flow will not therefore occur between the conduits 21 and 22 even if both valve elements are in open position. It will therefore be obvious that for simultaneous flow from both the conduits 21 and 22 into the conduit 23, the pressure in both the conduits 21 and 22 must be maintained substantially equal to each other.

The valve arrangement illustrated in FIGS. 1—3 has wide application where the objective is to selectively connect a first pressure source with second and third pressure sources without communication between the second and third pressure sources. For example, in the production of oil two producing zones often are in communication with the same well bore and it may be desired to have fluid communication between a conduit in the well bore and each of the producing zones without encountering the problem of communication between the two zones. By use of the illustrated valve structure treating fluids may be circulated between the conduit 23 and either of two producing zones which might be connected with the conduits 21 and 22 without encountering the problem of mixing the fluids in the zones connected with the conduits 21 and 22.

Another valve constructed according to the invention is illustrated in FIGS. 4—9. Referring to FIG. 4 the valve 70 is enclosed in the housing 71 which is connected to the conduits 72, 73, and 74. The valve permits fluid communication between the conduit 74 and either of the conduits 72 and 73 but not directly between the conduits 72 and 73. The valve assembly is retained in the housing between the internal annular shoulder 75 formed in the housing against which one end of the assembly rests and the internal annular retainer ring 80 threaded into the housing at the other end of the assembly. The valve includes an annular operator piston 81 slidably disposed within the valve housing to enclose and operate the ball valve elements in response to pressure changes in the several conduits connected to the valve. The operator piston is supported at opposite ends around the tubular shaped valve seat bodies 82 and 83 which cooperate with the central dual valve seat body 84 to rotatably support the ball valve elements 85 and 90. The valve seat bodies 82 and 83 are threaded into the end seal assemblies 91 and 92, respectively, which support the valve and seal with the inner wall of the housing at opposite ends of the valve.

The annular piston heads 93 and 94 are threaded into the opposite ends of the operator piston around the valve seat bodies 82 and 83, respectively. An O-ring 95 in the internal annular recess 100 within the piston head 93 seals between the piston head and the external surface of the tubular valve seat body 82. An external annular rotated by the operator assembly 140 including the operator body 82 within the operator piston to engage the inner wall of the piston. O-ring 102 within the external annular recess 103 around the flange seals between the flange and the inner wall of the piston. The inward end 104 of the piston head and the outer shoulder 105 on the flange 101 cooperate with the outer surface of the valve seat body 82 and the inner surface of the piston to form an annular variable volume cylinder 110. A plurality of ports 111 through the wall of the valve seat body connect the annular cylinder with the bore 112 of the valve seat body. An annular valve seat surface 113 is formed on the inward end of the valve seat body around the bore 112 to seat against the ball valve 85.

The annular piston head 94 is threaded into the other end of the operator piston around the valve seat body 83. The O-ring 114 in the internal annular recess 115 of the piston head seals between the outer surface of the valve seat body and the piston head. The external annular flange 120 is formed around the inward end of the valve seat body 83 and provided with an external annular recess 121 in which the O-ring 122 is positioned to seal between the flange and the inner wall of the operator piston. The shoulder 123 on inward end of the piston head 94 cooperates with the shoulder 124 on the outer end of the flange 120 and the outer wall of the valve seat body and the inner wall of the operator piston to define the variable volume annular cylinder 125. A plurality of ports 130 through the valve seat body into the annular cylinder provide fluid communication between the cylinder and the bore 131 of the valve seat body. An annular valve seat surface 132 is formed around the bore 131 on the inward end of the valve seat body to seat against the ball valve 90.

Figure 5:
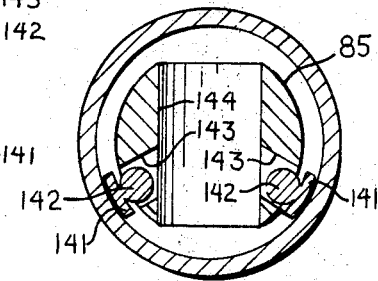
FIG. 5 is a sectional view along the line 5–5 of FIG. 4.
Figure 8:
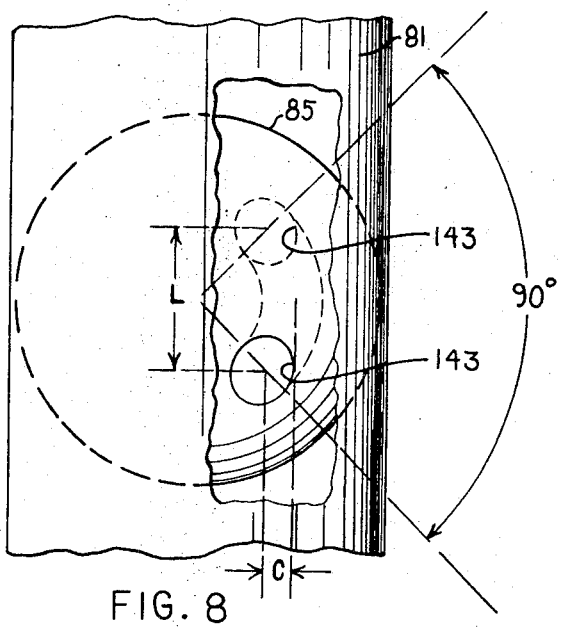
FIG. 8 is a diagrammatic representation of one of the ball valves and surrounding tubular structure, such as the valve housing, showing the rotation of the ball required to move the valve between closed and open positions.

The central valve seat body 84 is supported between the ball valves 85 and 90 by engagement of the annular seat surface 133 with the valve 90 and the annular seat surface 134 on the annular cap 135 with the ball valve 85. The cap 135 is threaded over one end of the central valve seat body to facilitate assembly of the valve structure. The ball valve 85 is rotated by the operator assembly 140 including the operator arms 141 each of which has an operator knob 142 engaging one of the holes 143 in the ball valve to rotate the bore 144 of the ball valve between the closed position illustrated in FIGS. 4 and 6 and the open position shown in FIG. 7. The operator arms 141 extend from the base ring 145 which is slidably engaged around the central valve seat body and biased away from the ball valve by the spring 150 disposed around the body between the base ring and the shoulder 151 on the annular cap 135. The ball valve is thus biased toward a closed position by the spring. As illustrated in FIG. 5 the two operator arms 141 are supported from the base ring spaced apart from each other approximately 120° around the ring to correspond with the spacing of the operator holes 143 in the ball valve. As will be explained in more detail in connection with the operation of the ball valve the operator knobs must move laterally or circumferentially a small distance as well as longitudinally to rotate the ball valve between open and closed positions. Therefore, the operator arms are slender and sufficiently flexible to permit the small lateral movement required of the operator knobs.

The ball valve 90 is rotatable to move its bore 152 between open and closed positions by engagement of the operator knobs 153 in the operator holes 154 through the valve. The operator knobs are formed on the operator arms 155 extending from the base ring 160 which is slidably disposed around the valve seat body 83 and biased away from the base ring by the spring 161 to urge the valve toward a closed position. The spring 161 is confined between the external annular shoulder 162 on the valve seat body and the outer face of the base ring 163. The base ring 160 along with its associated operator arms and knobs forms an operator assembly 164 which is structurally and functionally the same as the operator assembly 140.

A plurality of radially spaced ports extend through the central valve body 84 substantially along the middle of the body to permit the fluid communication from the bore 170 of the body into the operator piston. An internal annular flange 171 is formed within and along the center of the operator piston and provided with a plurality of radially spaced ports 172 to permit fluid to flow from within the operator piston through the piston wall. The annular flange 171 forms an internal annular shoulder 173 which is engageable with the base ring 145 of the operator assembly 140 and an internal annular shoulder 174 engageable with the base ring 160 of the operator assembly 164. Reciprocation of the operator piston 81 causes engagement between its internal annular flange and one of the base rings of one of the operator assemblies depending upon the direction of reciprocation to effect rotation of one of the ball valves.

The end support and seal assembly 91 includes an annular cap 175 having an external packing recess 180 in which is disposed the packing 181 held in place by the threaded retainer ring 182. The assembly 91 supports one end of the valve and seals around the valve with the inner wall of the housing 71. The other end of the valve is supported by the assembly 92 which includes the annular cap member 183 having an external packing recess 184 in which the packing 185 is positioned to seal with the inner wall of the housing 71. The packing is held on the cap by the threaded retainer cap 190. The space between the end assemblies 91 and 92 around the operator piston and the valve seat bodies defines the annular chamber 191 through which fluid flows from within the operator piston toward the conduit 74.

In operation, the valve 70 is connected to the conduits 72, 73 and 74 with the objective being to selectively provide fluid communication between the conduit 74 and either the conduits 72 or 73 as desired. With the ball valves 85 and 90 positioned as illustrated in FIG. 4 the valve is considered as fully closed with no fluid communication from the conduit 74 to either of the conduits 72 and 73 or between the conduits 72 and 73 themselves. Pressure increases within the conduit 74 to levels in excess of the pressure within the other two conduits will not affect the position of either of the ball valves, leaving them closed as illustrated. The pressure within the conduit 74 is exerted throughout the annular chamber 191 and through the openings 172 and 165 into both the operator piston and the central valve seat body thus contacting the surfaces of both of the ball valves except for the portion of the valve 85 exposed to the bore 112 and of the valve 90 exposed to the bore 131. The net effect of the greater pressure within the operator piston upon each of the ball valves is to urge the valves 85 and 90 into tighter sealing engagement with the seats 113 and 132 respectively.

If fluid flow is desired between the conduit 73 and the conduit 74, the pressure within the conduit 73 is raised to a level higher than the pressure in the conduit 72. The pressure in the conduit 73 is communicated through the openings 130 into the annular cylinder 125. The pressure from within the conduit 74 is ineffective to move the operator piston as it is applied completely around the operator piston 81 between the seals 181 and 185 within the annular chamber 191 and also through the ports 172 and 165 to the interior of both the operator piston and the central valve seat body. The lower pressure from the conduit 172 is applied through the openings 111 into the annular cylinder 110. The higher pressure from the conduit 73 is within the cylinder 125 while the cylinder 110 is exposed to the lower pressure within the conduit 72. There is, therefore, a tendency for the cylinder 110 to be reduced in volume by movement of the operator piston upwardly. This sliding action of the operator piston may be considered to be brought about by the force of the higher pressure upon the outer end of the piston head 93 which is opposed only by the lower pressure from the conduit 72 being exposed to the inner face 104 of the piston. As the operator piston 81 moves upwardly the shoulder 174 around the internal flange 171 of the piston engages the base ring 160 moving the operator members 155 toward the ball valve causing the operator knobs on the members to rotate the ball valve from the closed position shown in FIG. 4 to the open position illustrated in FIG. 9. During the movement of the operator piston upwardly the ball valve 85 remains in the closed position since the shoulder 173 on the internal flange of the piston moves away from the base ring 145 thus not contacting the operator assembly for the valve.

Figure 6:
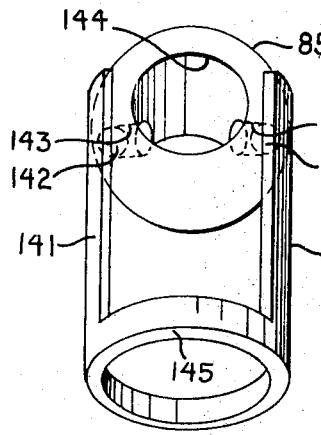
FIG. 6 is a view in perspective of one of the ball valves and its operator assembly as used in the valve of FIG. 4, showing the ball valve in closed position as shown in FIG. 4.
Figure 7:
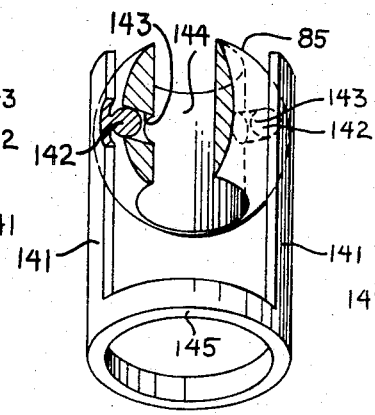
FIG. 7 is a view similar to FIG. 6 showing the ball valve rotated to the open position.

As the operator assembly 164 moves toward the ball valve 90, the valve is moved from the position illustrated in FIGS. 4 and 6 to the position as shown in FIGS. 7 and 9. While the FIGS. 5—8 are presented in terms of the lower valve 85 and its related structure, it will be understood that the upper valve 90 and its operator assembly are identical in all respects to the lower valve mechanism. The perspective views of FIGS. 6 and 7 along with the FIG. 8 best illustrate the movement of the operator assembly and the ball valve as the valve is rotated from the closed to the open position. The operator knobs, as shown in FIG. 5, are spaced circumferentially substantially 120° apart. As the operator members move the ball valve between open and closed rotating the valve the 90° required to effect such movement, each of the operator holes in the ball valve follows the arcuate path shown by the dotted lines in FIG. 8. As each of the operator holes follows the arcuate path shown, the operator knob engaged in the operator hole, in order to rotate the ball valve, moves longitudinally the distance L and oscillates a distance C around the circumference of the ball valve as diagrammatically represented in FIG. 8. It will be seen, therefore, that the operator members are sufficiently flexible to tolerate the lateral or circumferential movement the distance C to permit the operator knobs to follow this arcuate path of the operator holes in the ball valves in order to rotate the ball valves between the closed and open positions.

With the ball valve 90 moved to the open position illustrated in FIG. 9, flow may take place between the conduits 73 and 74 through the path defined by the bore 131 in the valve seat body 83, the bore 152 of the ball valve 90, the bore 170 of the central valve seat body, the ports 165 and 172 of the central valve seat body and operator piston, respectively, and into the annular space 191 around the operator piston to the conduit 74. While the longitudinal displacement of the operator piston in moving the ball valve 90 to the open position shown in FIG. 9 results in misalignment of the ports 165 and 172, as illustrated, the fluids flowing through the ports 165 move into the annular space between the central valve body and the operator piston and flow from such annular space through the ports 172 to the exterior of the annular piston. So long as the pressure within either the conduits 73 or 74 is maintained at a level sufficiently above the pressure within the conduit 72 the valve will remain in the open position of FIG. 9 and flow may either be terminated or may occur in either direction between the conduits 73 and 74. It is again emphasized that while the valve cannot be opened in either direction by an increase in pressure within the conduit 74, the valve may be held open by the pressure in the conduit 74 after having been opened by a pressure increase in either of the conduits 72 and 73. For example, if the valve is opened by the pressure in the conduit 73 with the pressure relationship then being shifted with flow occurring from the conduit 74. The higher pressure from the conduit 74 will be applied in the cylinder 125 to hold the operator piston upwardly and the valve 90 open.

The ball valve 90 is closed by lowering the pressure within the conduits 73 and 74 to a level which permits the force of the spring 161 to return the operator piston to the neutral position shown in FIG. 4. Also the pressure in the conduit 72 may be raised above the conduits 73 and 74 to effect the same results. As the spring moves the operator assembly 164 toward the center of the valve, the inward end of the base ring 160 engages the internal annular shoulder 174 forcing the operator piston back toward the neutral position. This movement of the base ring of the operator assembly causes the operator knobs 153 to rotate the ball valve 90 back to the closed position illustrated in FIG. 4. With the ball valve 90 returned to the closed position the valve is once again fully closed with communication being prevented between the conduit 74 and either of the conduits 72 and 73 and also between the conduits 72 and 73 themselves.

If fluid communication is desired between the conduits 74 and 72 the pressure within the conduit is raised to a level above the pressure in the conduit 73 sufficiently to displace the operator piston downwardly to rotate the ball valve to the open position. The procedure of opening the ball valve 85 is identical to the opening of the ball valve 90. An increase in the pressure in the conduit 72 is applied through the bore 112 and the ports 111 into the annular cylinder 110. The pressure in the cylinder 110 is now higher than the pressure in the cylinder 125. All surfaces exposed to any pressure from the conduit 74 are equal and opposite surfaces and thus the pressure from the conduit 74 cancels out and is not effective to move the operator piston. The higher pressure in the cylinder 110 acting against the lower pressure within the cylinder 125 tends to diminish the size of the cylinder 125 and increase the cylinder 110 causing the operator piston to move downwardly effecting engagement of the annular shoulder 172 within the operator piston with the base ring 145 of the operator assembly 140 to move the operator members and operator knobs 142 rotating the ball valve 85 from the closed position shown in FIG. 4 in the open position. When the ball valve is open, fluid may flow from the conduit 72 through the bore 112, the bore 144 in the ball valve, the bore 170 and the ports 165 and 172 through the central valve seat body and the operator piston, respectively, into the chamber 191 and to the conduit 74. So long as the pressure within either of the conduits 72 and 74 is maintained higher than the pressure in the conduit 73 the valve will remain open. The pressure relationships may be adjusted so that a condition of either no flow or flow in either direction may be maintained through the valve between the conduits 72 and 74. If the pressure in the conduits 73 and 74 are equal and higher than in the conduit 72, the valve 90 will remain open with no flow. If the pressure in the conduit 74 is higher than 72 and 73, the valve will remain open with flow from the conduit 74 to the conduit 73. The valve is again returned to closed position when desired by lowering the pressures in the conduits 72 and 74 sufficiently to lower the pressure in the cylinder 125 to a level relative to the cylinder 110 for the spring 150 to expand drawing the ball valve 85 back to the closed position and returning the operator piston again to the neutral position.

The procedure of opening the ball valves in the valve of FIGS. 4—9 may be varied by use of different pressure relationship from those described above in order to bring about the necessary longitudinal movement of the operator piston. For example, if the ball valve 90 is to be opened the pressure within the conduit 72 may be lowered to a level below the pressure within conduit 73 so that the pressure within the annular cylinder 125 will exceed the pressure within the annular cylinder 110 to cause the higher pressure within the cylinder 125 to force the operator piston upwardly. The net effect of this procedure is identical to those previously described but is merely effected by lowering a pressure in one conduit as distinguished from raising the pressure in another conduit.

When a ball valve at one end of the valve of FIG. 4 is open, the pressure within the two conduits in communication and thus through the open portion of the valve is greater than the pressure within the closed conduit and therefore the other ball valve leading to the closed conduit is biased against the seat around the bore of the valve body leading to the closed conduit to more effectively seal between the ball valve and such seat. For example, if the conduits 73 and 74 are in communication by virtue of ball valve 90 being open the pressure within the bore 170 will exceed the pressure within the bore 112 causing the ball valve 85 to be urged more tightly against the seat 113 as the pressure within the bore 170 increases. It may therefore be seen that some flexibility may be permitted in the construction of the valve with respect to the tolerances of the various parts including the ball valves and their respective seats as the pressure will tend to urge the ball valves more tightly against the seats through which there is a tendency toward leakage and therefore surface irregularities in the ball valves and seats may be compensated for by the biasing effect of pressure within the valve.

Another valve constructed in accordance with the invention is illustrated in FIG. 10. The valve 200 controls fluid flow between the conduit 201 and either of the conduits 202 and 203. As in the case of the previously discussed valves, the conduit 201 may be in communication with either of the other conduits but not both at the same time while the conduits 202 and 203 do not communicate with each other. A tubular housing 204 is supported within the conduits between the seal assemblies 205 and 210. The assembly 205 includes a seal mandrel 211 threaded into the housing and having an external annular recess 212 in which the seal assembly 213 is retained by the retainer ring 214. Threaded into the other end of the tubular housing is the seal assembly 210 which includes the seal mandrel 215 which is provided with an external annular recess 220 in which is positioned the seal assembly 221 held by the retainer ring 222. A fishing neck 223 having an external annular flange 224 is formed on the seal mandrel to facilitate insertion and removal of the valve through the conduit 203. The seals 212 and 221 seal with the inner surface of the conduits 203 and 202 to define an annular space 225 within the conduits around the tubular housing. A lower valve seat body 230 threaded into the mandrel 211 extends into the tubular housing and is provided on its inward end with an annular valve seat surface 231 around the bore 232 through the body. The external annular flange 233 is formed around the inward end of the valve seat body providing an annular shoulder 234. An annular piston 235 is slidably disposed around the valve seat body with an O-ring 240 in the internal annular recess 241 within the piston sealing between the outer surface of the valve seat body and the inner surface of the piston. The O-ring 242 within the external annular recess 243 around the piston seals between the outer surface of the piston and the inner surface of the tubular housing 204. The annular cylinder 244 is defined by the inner wall of the housing, the outer wall of the valve seat body, the inward end of the mandrel 211 and the outward end of the piston 235. The cylinder 244 and the bore 232 are connected through a plurality of ports 245 radially positioned around and extending through the wall of the valve seat body.

An external annular recess 250 is formed around the inward end of the piston 235.

At the other end of the valve, the upper valve seat body 251 is threaded into the upper seal mandrel 215 projecting into and concentric with the tubular housing 204. The inward or lower end of the valve seat body is provided with an annular valve seat surface 252 around the bore 253 through the body in alignment with the bore 254 through the mandrel 215. An external annular flange 255 around the lower end of the body 251 provides a shoulder 260 around the body. The annular piston 261 is slidably positioned around the valve seat body within the tubular housing with the O-ring seals 262 and 263 positioned in the annular recess 264 and 265 respectively, to seal between the piston and the external surface of the valve seat body and the internal surface of the tubular housing. The inward ends of the mandrel 215, the outward end of the piston 261, the inner surface of the tubular housing, and the outer surface of the valve seat body define an annular cylinder 270 which communicates with the bore 253 through a plurality of radially positioned ports extending through the wall of the valve seat body. The inward end of the annular piston 261 is provided with an external annular recess 272.

The ball valves 273 and 274 are held on the valve seats 231 and 252, respectively, by the central valve seat body 275. The annular seal surface 280 around the lower end of the central valve seat body along with the seat surface 231 supports the ball valve 273. The annular valve seat surface 281 on the upper end of the central body and the seat surface 252 support the ball valve 274. The ball valves are linked with each other and with the pistons 235 and 261 by the operator members 283 which extend between and engage the recesses 250 in the piston 235 and 272 in the piston 261. The operator members are connected to the ball valves by the operator knobs 284 and 285 which engage the operator holes 290 and 291 in the ball valves 273 and 274, respectively. Each of the ball valves has two operator holes spaced apart substantially 120° as previously discussed in connection with the valve 70 illustrated in FIG. 4. Two operator members 283 are employed to interconnect the ball valves with each other and with the annular pistons 235 and 261 so that the pistons may rotate the ball valves between open and closed positions. The operator holes in the ball valves are aligned longitudinally so that the two operator members extend substantially parallel to the longitudinal axis of the tubular housing and to each other spaced apart as shown in FIG. 5 so that the operator members may function as those of the valve of FIG. 4 in moving through the longitudinal and circumferential paths followed by the operator knobs in rotating the ball valves between their open and closed positions. Fluid may flow through the bore 282 of the central valve seat body, through the radially positioned ports 293 into the housing, and through the ports 294 of the housing to permit fluid communication into the annular space 225 from the ball valves.

It will be obvious that since common operator members are employed for actuating both of the ball valves and thus the ball valves are rigidly interconnected with each other they must move simultaneously. It is therefore necessary in order to interconnect the conduit 201 with either the conduit 202 or 203 and prevent the conduits 203 and 202 from communication with each other that the ball valves be positioned out of phase so that one is closed while the other is open. As illustrated in FIG. 10, the ball valve 273 is open permitting communication between the conduits 201 and 203 while the ball valve 274 is closed. When the ball valve 274 is opened by the operator members, they will close the valve 273. To ensure that the valves do not linger between positions and thus move between completely open and completely closed positions, each of the annular pistons is provided with a detent assembly, piston 235 with a detent assembly 295 and piston 261 with detent assembly 300.

Referring to FIG. 10, the detent assembly 295 includes a plurality of outwardly extending radially spaced collet fingers 296 formed around the piston 235. The collet fingers are laterally flexible so that they may be expanded and contracted radially for locking and unlocking the piston 235 at the extreme downward end of its stroke. Each of the collet fingers is provided with an inwardly extending boss 297 to engage the split ring 298 disposed around the valve seat body in the external annular recess 299 to provide a locking flange for the collet fingers. As the piston moves downwardly to the bottom end of the stroke the collet fingers spring outwardly and around the split ring with the fingers retracting inwardly when the bosses have passed the split ring. The bosses engage the lower surface of the split ring to hold the piston in its lowermost position until the pressure within the cylinder 244 is sufficiently high to push the piston with adequate force to cause the collet fingers to spring outwardly and disengage the split ring allowing the piston to move upwardly. The pressure at which the collet fingers disengage is high enough that when the collet fingers unlock the piston the piston will move the ball valves completely between positions so that the valves are not left in a partially open or closed condition. The detent assembly 300 at the other end of the valve includes the collet fingers 301 formed on and extended outwardly from the annular piston 261. The collet fingers have the inwardly projecting bosses 302 which releasably engage the split ring 303 positioned in the external recess 304 around the valve seat body 251. The collet fingers are laterally flexible so that when the piston moves to the upper end of its stroke the collet fingers will spring outwardly with the bosses sliding over the split ring to again spring inwardly when the bosses have passed the split ring as shown in FIG. 10 to lock the piston to the split ring at the upper end of its stroke. When the pressure within the cylinder 270 is raised to the desired predetermined level for moving the valves completely between open and closed position the collet fingers will disengage to permit the piston to be displaced downwardly.

The valve 200 is moved between the position connecting the conduits 201 with 203 and the position connecting the conduits 201 and 202 by the action of the pressure from the conduits on the annular pistons 235 and 261. For example, in order to close the valve 273 and open the valve 274 to place the conduits 201 and 202 in communication, the pressure is raised within the conduit 202 to a level sufficiently in excess of the pressure in the conduits 201 and 203 to cause the higher pressure within the conduit 202 to be applied through the ports 271 into the annular cylinder 270 to displace the piston 261 downwardly. The lower cylinder 244 is exposed to the lower pressure of the conduits 203 and 201 through the port 245 while the upper cylinder is exposed to the higher pressure of the conduit 202 through the port 271. When the pressure within the conduit 202 is raised sufficiently, the piston 261 is forced downwardly to rotate the ball valve 274 to the open position while rotating the ball valve 273 to the closed position. Since the inward ends of the annular pistons 235 and 261 are both exposed to the same fluid pressure within the tubular housing 204 the only pressure differential being imposed across the annular pistons is within the annular cylinders which are each exposed to the pressure within the conduits at the opposite ends of the valve and thus the higher pressure within one conduit such as 202 within the annular cylinder at that end will displace that cylinder and the operator members toward the ball valves since that piston is interconnected with the piston at the other end which is exposed to the lower pressure of the other conduit. In order to insure that the ball valves will move completely from one position to another position and thus avoid lingering between open and closed positions, the detent assemblies on each of the annular pistons are adjusted to retain each piston until the pressure with its respective cylinder is built up to a sufficiently high level to displace the piston the required distance to fully close one ball valve and open the other. For example, in moving the valve from the position of FIG. 10 to the position in which the ball valve 274 is open and 273 is closed, the detent assembly 300 holds the piston 261 in the position illustrated until the pressure within the annular cylinder 270 is high enough that upon release the piston will immediately move the full length necessary to fully open the valve 274 and fully close the valve 273. As in the case of the other forms of valves previously discussed, the embodiment of FIG. 10 is not operable in response to the pressure within the conduit 201 but rather operation must be initiated by a pressure differential between the conduits 202 and 203. Once, however, the valve is in a given open position a condition of flow in either direction or no flow may exist between the two particular conduits which are in communication so long as the pressure in either or both of the communicating conduits is above the pressure in the closed conduit.

A still further form of valve constructed according to the invention is illustrated in FIG. 11 wherein a single ball valve is rotatable between two positions to selectively place one zone in communication with one of two other zones. Referring to FIG. 11, the valve 310 is positioned within the conduits 311 and 312 which are interconnected with the conduit 313. The tubular valve housing 314 is supported at the opposite ends by the seal assemblies 315 and 320. The assembly 315 includes a seal mandrel 321 with an external annular recess 322 for the packing assembly 323 to seal with the inner wall of the conduit 311. The packing assembly is secured on the mandrel by the retainer ring 324. The seal assembly 320 includes the seal mandrel 325 which supports the packing assembly 330 in the annular recess 331 to seal between the end member and the inner surface of the conduit 312. The packing assembly is held on the mandrel by the annular retainer ring 332. A fishing neck 333 having an external annular flange 334 is formed on the end member to permit the connection of a suitable running and pulling tool with the valve.

The valve seat bodies 335 and 340 are threaded into the seal mandrels 321 and 325, respectively, and extend toward each other within the tubular housing. The ball valve 341 is supported by the valve seat bodies between the annular seat 342 on the body 335 and the annular seat 343 on the body 340. The L-shaped flow passage 344 through the ball valve allows fluid flow from either the bore 345 through the body 335 or the bore 350 through the body 340 into the annular space 350a around the valve seat bodies. Fluid may then flow through the ports 351 in the tubular housing 314 into the conduit 313. The ball valve is interconnected with the annular pistons 353 and 354 by the operator members 352. The operator balls 355 on the operator members fit into the operator holes 360 within the ball valve. The operator members are engaged at opposite ends into the annular recesses 361 around the inward end of the piston 353 and 362 around the inward end of the piston 354. The ball valve 341 has two operator holes spaced approximately 120° apart in which are engaged the operating knobs of two operator members. The movements of both the ball valve and the operator members in rotating the ball valve between open and closed positions are identical to the movements of the corresponding members of the other embodiments of the valve previously discussed.

The O-ring 363 in the annular recess 364 seals between the piston 353 and the seat body 335 while the O-ring 365 in the recess 370 seals between the piston and the housing 314. The O-ring 371 in the internal annular recess 372 of the annular piston 364 and O-ring 373 in the recess 374 of the piston seals between the piston and the seat body 340 at the housing 314, respectively.

An annular cylinder 375 is defined by the valve seat body 335 and the tubular housing between the inward end of the seal mandrel 321 and the outer end of the piston 353. The cylinder 375 is connected with the bore 345 by the port 376 through the seat body. A detent assembly 380 detachably engages the annular piston 353 at the outward end of its stroke to insure movement of the ball valve from the fully closed to the fully open position.

At the other end of the valve the outward end of the annular piston 354 with the inward end of the seal mandrel 325 and the inner surface of the tubular housing and the outer surface of the valve body 340 form another annular cylinder 390 which is in fluid communication with the bore 345 through the radially positioned ports 391 through the valve seat body. A detent assembly 392 detachably engages the annular piston with the valve seat body until a predetermined pressure differential is reached in the cylinder to ensure that the ball valve will move from the closed to the open position without lingering at an intermediate position.

The detent assembly 380 comprises a plurality of collet fingers 381 formed on and extending outwardly from the annular piston 353 with the inwardly extending bosses 382 being engageable over the split-lock ring 383 positioned in the external annular recess 384 around the valve seat body 335. The collet fingers are laterally flexible so that when the piston moves to the lower end of its stroke the bosses engage the lock ring causing the collet fingers to spring outwardly until the bosses have passed the lock ring when the fingers spring inwardly to lock the fingers over the lock ring thus holding the piston at its lowermost position until the pressure within the cylinder 375 is raised to a sufficiently high level to disengage the collet fingers and allow the piston to be forced upwardly. The pressure at which disengagement of the piston is effected is determined by the pressure necessary to move the pistons and ball valve completely from one position to another position without the valve's lingering between such positions.

The detent assembly 392 at the other end of the valve includes the collet fingers 393 extending outwardly and radially positioned around the annular piston 354. Each of the detent fingers has an inwardly projecting boss 394 engageable over the split-lock ring 395 positioned in the external annular recess 396 around the valve seat body 340. The collet fingers are illustrated in FIG. 11 engaged over the lock ring holding the piston in the upper position at the upper end of its stroke. When the pressure is raised to a predetermined level in the cylinder 390, the collet fingers will be cammed outwardly by the lock ring disengaging the fingers from the lock ring to permit the piston to be forced downwardly. The collet fingers hold the piston in the upper position until the pressure is high enough to fully displace the piston downwardly to move the ball valve from the illustrated position to the other position at which the valve flow passage connects with the flow passage 350.

As illustrated in FIG. 11, the ball valve 341 is positioned to allow fluid flow between the conduits 311 and 313 through the bore 345, the flow passage 350, and the ports 351 in the tubular housing 314. So long as the pressure within the bore 345 is maintained higher than the pressure within the bore 350 the valve will remain in the position illustrated permitting fluid flow in either direction between the conduits 311 and 313. The pressure in the bore 345 may result from a higher pressure in either or both of the conduits 311 and 313. When it is desired to move the ball valve from the position illustrated to a second position interconnecting the conduits 312 and 313, the pressure within the conduit 312 is raised above the pressure within the conduits 311 and 313 a sufficient amount to displace the annular piston 354 toward the ball valve to rotate the ball valve 90° to a position in which the flow passage 350 is encompassed by the valve seat 343 to connect the flow passage with the bore 350. The pressure within the bore 350 is applied through the radial ports 391 into the annular cylinder 390 against the outward end of the annular piston 354. Through the ports 376 the pressure within the bore 345 is imposed on the outward end of the annular piston 353 and since this pressure is lower than the pressure within the annular cylinder 390 the pressure differential across the opposite ends of the interconnected pistons causes both of the pistons along with the operator members 352 to move downwardly rotating the ball valve from the position shown to the second position interconnecting the conduits 312 and 313. In raising the pressure within the annular cylinder 390 the detent assembly 392 retains the annular piston in the position shown until a predetermined pressure level is reached which is sufficiently high to cause the pistons, the operator members, and the valve to move sufficiently to shift the valve to the desired position without lingering at an intermediate position which would place the flow passage 360 in communication with both of the bores 344 and 345 simultaneously. When the annular pistons reach the other end of their travel path the detent mechanism 380 engages the annular piston 353 to hold the piston in the downward position until movement of the valve is again desired by raising the pressure within the annular cylinder 375. When the ball valve is at either of the open positions, the higher pressure within the flow passage 344 and around the outer surfaces of the valve exposed to the fluid flowing between the two conduits which are interconnected biases the ball valve toward the seat on the valve body associated with the conduit which is closed off and therefore leakage is minimized from the communicating conduits into the conduit which is closed.

It will now be seen that there has been described and illustrated a new and improved fluid flow control apparatus for selectively interconnecting a plurality of zones in response to pressure differentials established between communicating and noncommunicating zones.

It will be further seen that there has been described and illustrated a new and improved valve assembly for connection between three pressure sources with the first pressure source being selectively connectable to second and third pressure sources while the second and third pressure sources are not connectable with each other.

It will also be seen that operation of the valve may be initiated from the second and third pressure sources to selectively connect each of the sources with the first pressure source but operation of the valve is not initiatable from the first pressure source.

It will additionally be seen that there is provided a valve assembly which selectively connects either of the second and third pressure sources with the first pressure source by initiating valve action from either of the second and third pressure sources and which subsequent to connection between the desired two pressure sources will remain open so long as a predetermined pressure differential is maintained to permit a state of either no flow between the connected sources or flow in either direction between the sources.

It will additionally be seen that one form of valve assembly according to the invention includes interconnected plug-type valves reciprocable between four positions for interconnecting a first pressure zone with either of second and third pressure zones or prohibiting all flow between any of such pressure zones.

It will also be seen that another form of valve assembly according to the invention includes two rotatable ball valves between a central flow passage end connecting first and second flow passages. The ball valves being rotatable to connect the control flow passage with either of the other flow passages but not to connect the other flow passages with each other.

It will additionally be seen that a further form of valve according to the invention includes two ball valves each of which is independent of the other and spring biased toward a closed position while the valves are rotatable in response to movement of a flange on a reciprocable tubular type operator piston encompassing both of the valves.

It will also be seen that another form of a valve according to the invention includes two ball valves interconnected with each other so that one ball valve is in an open position while the other is in closed position, such relative positions being reversed upon rotation of the valves by a common interconnecting operator member actuated by pressure responsive pistons exposed to the pressure in two zones which are connectable with another zone by the valve.

It will be further seen that another form of valve according to the invention includes a single rotatable ball valve positioned between two tubular seat bodies and rotatable by an interconnected pressure responsive annular piston between a first position for connecting a first pressure zone with a second pressure zone to a second position for connecting the first pressure zone with a third pressure zone.

The foregoing description of the invention is explanatory only, and changes in the details of the construction illustrated may be made by those skilled in the art, within the scope of the appended claims, without departing from the spirit of the invention.

I claim:

1. A valve for controlling fluid flow between a first zone and second and third zones comprising: housing means provided with means for connection to first, second and third pressure sources at said first, second and third zones, respectively; means at one end of said housing means providing a flow passage from said second zone encompassed by an annular valve seat surface; a first ball valve positioned in engagement with said valve seat surface; means at the other end of said housing means providing a flow passage from said third zone surrounded by an annular valve seat surface; a second ball valve supported in engagement with said last mentioned valve seat surface; means between said ball valves providing a flow passage from each of said ball valves to said first zone and a valve seat in engagement with each of said ball valves; each of said ball valves having a bore extending therethrough adapted to be aligned with said seats engaged with said ball valves to permit fluid flow through each of said ball valves; operator means operatively engaged with said ball valves for rotating said ball valves between open and closed positions, said operator means being exposed at opposite ends to the pressure within the flow passages at the ends of said housing means to cause said operator means to shift in response thereto and to thereby rotate said ball valves.

2. A valve for controlling fluid flow between a first zone and second and third zones comprising: a valve housing having a flow path therethrough; a first ball valve rotatably positioned in said housing and provided with a bore therethrough for controlling fluid flow between said first and second zones; a second ball valve rotatably positioned within said housing and provided with a bore therethrough; and spaced apart from said first ball valve for controlling fluid flow between said first zone and said third zone; means between said ball valves providing an exclusive flow path from said ball valves to said first zone; reciprocable operator means positioned within said housing and exposed at one end to the pressure of said second zone and at the other end to the pressure of said third zone for reciprocation of said operator means by said pressures, means interconnecting said operator means and said ball valves for rotating said ball valves between opened and closed positions responsive to reciprocation of said operator means.

3. A valve for controlling fluid flow between a first zone and second and third zones comprising: a housing; said housing having means forming a lateral flow passage for connection to said first zone and with means forming flow passages from the opposite ends thereof for connection to said second and third zones; a first ball valve rotatably supported within said housing for controlling fluid flow between said lateral flow passage and said second zone through a first of said end flow passages; a second ball valve rotatably supported in said housing and spaced apart from said first ball valve for controlling fluid flow between said lateral flow passage and said third zone through a second of said end flow passages each of said ball valves being provided with a bore therethrough; reciprocable operator means positioned within said housing and interconnected with said ball valves for rotating said ball valves between open and closed positions one end of said operator means being exposed to the pressure in one of said end flow passages and the other end of said operator means being exposed to the pressure in the other of said end flow passages for reciprocating said operator means in response to said pressures.

4. Apparatus for controlling fluid flow between a first zone and second and third zones comprising; a housing connectable at opposite ends to conduits leading to said second and third zones and having lateral connecting means for a conduit leading to said first zone; a first annular seal assembly on the end of said housing adjacent to said second zone; a second annular seal assembly on said housing at the end adjacent to said third zone; a first valve seat body extending into said housing from said first seal assembly; a second valve seat body extending into said housing from said second seal assembly; each of said valve seat bodies having a bore therethrough and an annular valve seat surface on the inward end thereof; a first ball valve having a bore therethrough positioned in engagement with the valve seat surface on the inward end of the said first valve seat body for controlling fluid flow between said first and said second zones; a second ball valve having a bore therethrough supported on said valve seat surface on the inward end of said second valve seat body for controlling fluid flow between said first and said third zones; a central valve seat body having annular valve seat surfaces on opposite ends and a bore therethrough between said valve seat surfaces of said central valve seat body; said central valve seat body being positioned between said ball valves with each of said valve seat surfaces at the opposite ends of said central valve seat body being engaged with one of said ball valves; said central valve seat body having port means opening therethrough to permit fluid flowing from either of said ball valves to discharge laterally from the bore of said central valve seat body; operator means engaged with each of said ball valves for rotating said ball valves between opened and closed positions; means engageable with said operator means and reciprocable responsive to differences in the pressures in the bores through the first and second valve seat bodies for actuating said operator means to rotate said ball valves between said open and closed positions.

5. A valve for controlling fluid flow between a first zone and second and third zones comprising: a housing having means connectable at opposite ends to said second and third zones and having means for a lateral connection to said first zone; a first annular packing and end support assembly having a bore therethrough positioned within one end of said housing; a second annular packing and end support assembly positioned within the other end of said housing; a first valve seat body having a bore therethrough and an annular valve seat around the inward end thereof engaged in said first packing and end support assembly and extending into said housing therefrom; a second valve seat body having a bore therethrough and an annular valve seat around the inward end thereof engaged in said second packing and end support assembly and extending into said housing therefrom; a central valve seat body having a bore therethrough positioned between said first and said second valve seat bodies, the outward ends of said central valve seat body being spaced apart from the inward ends of said first and second valve seat bodies; each of said outward ends of said central valve seat body having an annular valve seat surface around said bore through said central valve seat body; a first ball valve supported by and between the adjacent seats on said first valve seat body and said central valve seat body, said ball valve having a flow passage extending therethrough and being rotatable between opened and closed positions; a second ball valve supported between the adjacent valve seats on said second valve seat body and said central valve seat body, said second ball valve having a fluid flow passage therethrough being rotatable between closed and open positions; said central valve seat body having port means opening therethrough to permit fluid flowing from either of said ball valves to discharge laterally from the bore of said central valve seat body; a first operator assembly slidably disposed around said central valve seat body and engaged with said first ball valve; a second operator assembly slidably disposed around said central valve seat body and engaged with said second ball valve; a tubular operator piston slidably positioned around said valve seat bodies and said operator assemblies extending between said first and second valve seat bodies over said ball valves and said central valve seat body; the opposite ends of said operator piston having annular piston heads slidably engaged in sealed relationship around said first and said second valve seat bodies; the inward ends of said first and second valve seat bodies having outwardly extending annular flanges in slidable sealed relationship with the inner surface of said operator piston; each of said first and said second valve seat bodies cooperating with the outward portions of said operator piston to form an annular variable volume cylinder between each of said first and second valve seat bodies and said operator piston; each of said first and second valve seat bodies having radial port means extending therethrough to interconnect the bore of each valve seat body with the annular cylinder around said valve seat body for transmitting the pressure from said second and third zone into the annular cylinders associated with said first and second valve seats bodies, respectively, and said operator piston; and said operator piston being provided with an internal central annular operator flange having radial port means therethrough for fluid communication into said housing from within said piston, the opposite faces of said annular operator flange being engageable with said operator assemblies connected to each of said ball valves for rotating said ball valves responsive to longitudinal movement of said operator piston.

6. A valve according to claim 5 wherein each of said operator assemblies in biased inwardly toward a closed position of each of said ball valves by a spring engaged around said central valve seat body.

7. A valve for controlling fluid flow between a plurality of zones comprising: a housing open at opposite ends and having a lateral opening extending therethrough; a first annular seal assembly at one end for supporting said housing within and sealing with a conduit; a second annular seal assembly at the other end of said housing for supporting said housing within and sealing with a conduit; a first tubular valve seat body having a bore therethrough engaged with said first seal assembly extending into said housing and having an annular valve seat around the bore at the inward end thereof; a second tubular valve seat body having a bore therethrough and an annular valve seat surface around the inward end of said bore in said second valve seat body and secured to and extending into said housing from said second annular seal assembly; the inward ends of said first and said second valve seat bodies being spaced apart from each other; a first ball valve having a flow passage therethrough supported on said valve seat at the inward end of first valve seat body; a second ball valve having a flow passage therethrough supported on the inward end of said second valve seat body; a central valve seat body having a longitudinal bore extending therethrough and an annular valve seat surface around each end of said bore in said central valve seat body, said central valve seat body being engaged between said first and said second ball valves, said valve seat surface on the one end of said central valve seat body seating against said first ball valve and said valve seat on the other end of said central valve seat valves seating against said second ball valve; said central valve seat body having radial port means to allow fluid flow from said ball valves through said central valve seat body and outwardly from said central valve seat body; said first valve seat body and said second valve seat body being concentric with and spaced apart within said housing and forming an annular space between said housing and said first valve seat body and said second valve seat body; an annular piston slideably disposed around said first valve seat body; the outward end of said piston, the inward end of the said first annular seal assembly, the outer surface of said first valve seat body, and the inner surface of said housing forming in combination a first annular variable volume cylinder around said first valve seat body; said first valve seat body having radial port means opening from said bore through said first valve seat body into said first annular cylinder; an annular piston slidably disposed around said second valve seat body; the outward end of said annular piston, the inward end of said second seal assembly, the outer surface of said second valve seat body and the inner surface of said housing forming a second variable volume annular cylinder; said second valve seat body having radial port means opening from said bore through said second valve seat body into said second annular cylinder; operator means connected between the inward ends of said annular pistons and having operator knobs formed thereon, said operator knobs being engaged in operator holes provided in each of said ball valves for rotating said ball valves between opened and closed positions responsive to longitudinal movement of said operator means; and said first ball valve being oriented out of phase with said second ball valve whereby one of said ball valves will be open while the other of said ball valves is closed, and when the closed ball valve opens, the open ball valve will close.

8. A valve for controlling fluid flow between a plurality of zones comprising: a housing open at opposite ends and having lateral port means located substantially centrally thereof; first and second ball valves having flow passages therethrough rotatably positioned within said housing and spaced apart by a centrally positioned seat member and controlling fluid flow between said lateral port means and the opposite ends of said housing; said ball valves being supported by seat members located at the ends of said housing and by said centrally positioned seat members; said centrally positioned seat member having a bore and radial port means providing a flow path from said ball valves to said lateral port means; means of opposite ends of said housing movable longitudinally of said housing responsive to the pressure at the ends of said housing; operator means interconnecting said last mentioned means, said operator means being connected with each of said ball valves whereby said ball valves are rotated simultaneously by longitudinal movement of said operator means; and said ball valves being oriented out of phase with each other whereby when one of said ball valves is in closed position the other of said ball valves will be in open position.

9. A valve for controlling fluid flow between a first zone and second and third zone comprising: a housing open at opposite ends and having lateral port means intermediate said ends; an annular seal assembly engaged with each end of said housing for supporting said housing within and sealing with a conduit; ball valve means rotatably supported within said housing and movable between first and second positions, said ball valve means being provided with fluid flow passage means adapted to direct fluid between one end of said housing and said lateral port means when said ball valve means is in one position and to direct fluid between the other end of said housing and said lateral port means when said ball valve means is in the other position; means supported by said annular seal assembly at one end of said housing providing a flow passage to said ball valve means and an annular seat engaged with said ball valve means; means supported by said annular seal assembly at the other end of said housing providing a flow passage to said ball valve means and an annular seat engaged with said ball valve means; means responsive to the pressures in said flow passages leading from said ends of said housing to said ball valve means for rotating said ball valve means between said first and second positions.

10. A valve for controlling fluid flow between a plurality of zones comprising: a tubular housing open at opposite ends and having lateral port means intermediate said ends; a first annular seal assembly engaged with said housing at one end; a second annular seal assembly engaged with the other end of said housing; said seal assemblies being adapted to support said housing within a conduit and seal around said housing with said conduit; a first tubular body engaged with said first seal assembly extending into said housing to provide a flow passage through said one end of said housing and having an annular valve seat surface around said flow passage on the inward end of said body; a second tubular body engaged with said second seal assembly extending into said housing providing a flow passage through the other end of said housing and having an annular valve seat surface around said flow passage on the inward end of said second tubular body; the inward ends of said bodies being spaced apart from each other; a ball valve supported between the inward ends of said first and second tubular bodies on said valve seats of said bodies, said ball valve having a flow passage extending therethrough and shaped to direct fluid flow from within said first tubular body toward said lateral port means of said housing at a first position while closing off from the flow passage of said second tubular body; said flow passage of said ball valve directing fluid flow from said flow passage through said second tubular body toward said lateral port means when said ball valve is in a second position while closing off fluid flow from said flow passage through said first tubular body; said first and said second tubular bodies being spaced apart within and concentric with said tubular housing providing an annular space around each of said bodies within said housing; annular piston means disposed around each of said bodies within said housing; means providing a port through each of said tubular bodies to expose each of said annular piston means to the pressure in the flow passage through the tubular body associated with each of said piston means to cause each of said piston means to be reciprocated by said pressures in the associated flow passages; means interconnecting each of said piston means and said ball valve whereby said ball valve is rotated between said first and said second positions by a reciprocation of said annular piston means.

11. A valve for controlling fluid flow between a plurality of zones comprising: a tubular housing open at opposite ends and having a lateral port between said ends; a first annular seal assembly secured to one end of said housing; a second annular seal assembly secured to the other end of said housing; said annular seal assemblies being adapted to support said housing within a conduit and seal around said housing within said conduit; each of said seal assemblies having a flow passage extending therethrough to permit fluid flow into each end of said housing; a first tubular valve seat body secured to said first annular seal assembly and extending into and concentric with said housing; said first valve seat body having a flow passage extending therethrough and being provided on the inward end thereof with an annular valve seat around said flow passage in said first valve seat body; said first valve seat body being spaced apart within and from said housing to provide an annular space around said first valve seat body within said housing; a second tubular valve seat body secured to said second seal assembly and extending into and concentric with said tubular housing; said second valve seat body having a flow passage extending therethrough and an annular valve seat on the inward end of said second valve seat body around said flow passage in said second valve seat body; said second valve seat body being spaced apart within and from said housing providing an annular space around said second valve seat body within said housing; the inward ends of said valve seat bodies being spaced apart from each other; a ball valve rotatably supported by and between said valve seats on the inward ends of said valve seat bodies, said ball valve having an L-shaped flow passage extending therethrough for directing flow at one position between one end of said housing and said lateral port and at a second position between the other end of said housing and said lateral port, said ball valve closing off one of said flow passages through one of said valve seat bodies while opening the other of said flow passages; a first annular piston slidably disposed around said first valve seat body within said housing; the outward end of said first annular piston, the outer surface of said first valve seat body, the inner surface of said housing, and the inward end of said first annular seal assembly forming a variable volume annular cylinder around said first valve seat body; said first valve seat body being provided with port means communicating said annular cylinder with the flow passage through said first valve seat body; a second annular piston slidably disposed around said second valve seat body within said housing; the outward end of said second annular piston, the outer surface of said second valve seat body, the inner surface of said housing, and the inward end of said second annular seal assembly forming a variable volume annular cylinder around said second valve seat body; said second valve seat body having port means communicating said cylinder around said second valve seat body with said flow passage through said second valve seat body; means interconnecting said first and second annular pistons, said interconnecting means being engaged with said ball valve for rotating said ball valve between said first and second positions responsive to longitudinal movement of said annular pistons; and detent means associated with the outward end of each of said pistons at the outward end of each of said pistons for releasably holding each of said pistons at the outward end of its stroke until a predetermined pressure is applied to said piston within its respective cylinder.

12. A valve in accordance with claim 11 wherein each of said detent means comprises: a plurality of collet fingers formed on the outward end of the piston and means associated with each of said valve seat bodies engageable by said collet fingers when each of said pistons is at the outward end of its stroke.